United States Patent [19]

Sawada et al.

[11] Patent Number: 5,380,696
[45] Date of Patent: Jan. 10, 1995

[54] OXIDATION CATALYST AND PROCESS OF PREPARING SAME

[75] Inventors: Matsunori Sawada; Minoru Ogiso, both of Kanagawa, Japan

[73] Assignee: Tanaka Kikinzoku Kogyo K.K., Japan

[21] Appl. No.: 93,346

[22] Filed: Jul. 16, 1993

[30] Foreign Application Priority Data

Jul. 17, 1992 [JP] Japan .................................. 4-213319

[51] Int. Cl.$^6$ ......................... B01J 23/28; B01J 23/30; B01J 23/04; B01J 23/52
[52] U.S. Cl. ..................................... 502/313; 502/317; 502/321; 502/330; 502/339; 502/344; 210/763
[58] Field of Search ............... 502/101, 317, 313, 330, 502/339, 344; 204/192.15; 210/763

[56] References Cited

U.S. PATENT DOCUMENTS

| | | | |
|---|---|---|---|
| 4,021,592 | 5/1977 | Fromson | 502/439 |
| 4,472,533 | 9/1984 | Moskovits | 502/332 |
| 4,617,196 | 10/1986 | DuBois | 502/101 |
| 4,931,152 | 6/1990 | Naik et al. | 427/405 |

Primary Examiner—Anthony McFarlane
Attorney, Agent, or Firm—Klauber & Jackson

[57] ABSTRACT

Disclosed herein is a liquid phase oxidation catalyst which comprises a metal substrate and an outectoid coating containing palladium and, molybdenum and/or tungsten coated on the substrate.

According to the invention, the oxidation catalyst possessing excellent catalytic activity for oxidation which cannot be obtained by a catalyst prepared by means of pure palladium plating can be obtained. When palladium is compared with platinum, the cost of the latter is about four time larger than that of the former and the gravity of the latter is about two times larger than that of the former so that, if the same thickness of the metal is plated, the cost of the precious metal is advantageously reduced to about ⅛.

Also disclosed is a process of preparing this oxidation catalyst.

4 Claims, No Drawings

OXIDATION CATALYST AND PROCESS OF PREPARING SAME

BACKGROUND OF THE INVENTION

The present invention relates to a liquid phase oxidation catalyst and its preparation, and in particular to an oxidation catalyst especially suitable for oxidatively treating waste liquid having reducing ability and the like.

A pipe cleaner containing such a reductant as hydrogen peroxide and hydrazino is employed in various facilities for the purpose of removing scale accumulated on a boiler and a cooling water pipe. The cleaner is discharged as waste liquid after the pipe washing. When, however, due to the increase of chemical oxygen demand (COD), the waste liquid when a large amount of it is employed is required to be subject to such a treatment which makes the waste liquid harmless as an oxidation treatment with sodium hypochlorite.

Since the oxidation treatment with chemicals is expensive due to the necessity of the chemicals and facilities of the oxidation treatment, the treatment employing an oxidation catalyst comprising a metal support such as stainless steel and such a precious metal as palladium and platinum supported on the metal support has been of practical use.

The catalyst employed for the above application is conventionally prepared according to a baking process in which material such as palladium chloride which forms a catalyst layer and glassy material such as alumina which acts as a binder are applied on a metal substrate such as stainless steel and, after the sintering thereof, the substrate is baked to prepare the catalyst.

Many restrictions have been pointed out in the above process such that the evolution of such a harmful gas as hydrogen chloride and chlorine during the baking may occur and that the catalytic performance is likely to be influenced by the conditions for preparation such as a baking temperature and a blend ratio. In order to elevate the catalytic performance, the above restrictions must be resolved by means of the change of composition or the like.

The present inventors formerly attempted to provide the further catalytic performance by means of plating and invented an oxidation catalyst having a coating of platinum and, molybdenum and/or tungsten excellent in performance. However, the platinum was considerably expensive.

Then, the inventors further tried to develop another catalyst employing such less expensive material as palladium and having similar catalytic performance and a similar life to those of the platinum catalyst depending on the conditions employed. Although the catalytic performance similar to or higher than that of the catalyst was obtained by the baking process by means of palladium black plating, the adherence strength between the palladium layer and the metal substrate was inferior to produce the peel-off of the catalyst layer from the metal substrate so that the catalyst could not endure in the practical use. By means of ordinary palladium plating, the satisfactory adherence could be obtained but the sufficient catalytic performance could not be obtained.

The waste liquid after the pipe washing may contain another hydrochloric acid-based pipe cleaner as well as the above pipe cleaner containing the hydrogen peroxide and hydrazine so that the sufficient resistance to a running operation is also required.

SUMMARY OF THE INVENTION

An object of the present invention is to provide an oxidation catalyst having excellent catalytic performance produced by a special plating technique and a process of preparing same.

Another object of the present invention is to an oxidation catalyst which is especially useful for treating waste liquid and a process of preparing same.

The present invention has been made to overcome the above drawbacks of prior art. The liquid phase oxidation catalyst of the invention comprises a metal substrate and an eutectoid coating containing palladium and either of or both of molybdenum and tungsten coated on the substrate.

Between the substrate and the eutectoid coating, an intermediate gold layer may be formed.

According to the present invention, the oxidation catalyst possessing excellent catalytic activity for oxidation which cannot be obtained by a catalyst prepared by means of pure palladium plating can be obtained. Further, in accordance with the process of the invention, the evolution of the harmful gases in the baking process can be overcome. When palladium is compared with platinum, the cost of the latter is about four time that of the former and the gravity of the latter is about two times that of the former so that, if the same thickness of the metal is plated, the cost of the precious metal is advantageously reduced to about $\frac{1}{8}$.

The oxidation catalyst of the present invention is excellent in catalytic ability for oxidation exhibiting remarkable elevation of the catalytic activity when compared with that prepared by the baking process and is suitable for treatment of waste liquid having reducing ability. Further, the catalyst of the invention exhibits the catalytic performance the same as or higher than that of the platinum-based catalyst and can be prepared with a much lesser cost. According to the process of the invention, the preparation of the catalyst can be conducted with elevated efficiencies because no harmful gases such as chlorine are evolved.

DETAILED DESCRIPTION OF THE INVENTION

Although the amount of molybdenum and/or tungsten eutectoid deposited in palladium based-plating layer may not be especially restricted, it is noted that as the amount of the molybdenum and/or tungsten increases, the adhering strength thereof with the substrate is likely to decrease.

When the gold plating is performed, the gold plating provides sufficient resistance in a running operation as well as it elevates the adhering strength between the palladium coating and the substrate.

Although the use of such high resistant material as stainless steel, titanium and tantalum as the metal substrate is preferable in view of a long life, such less expensive material as copper and brass possesses the substantially same catalytic activities so that the material of the substrate may be selected in accordance with conditions ion which the catalyst is employed.

The substrate is preferably in the shape of mesh having a large contact area rather than a plate.

EXAMPLES

Although Examples of the invention will be described, these Examples are not construed to restrict the scope of the invention.

EXAMPLE 1

This Example illustrates the process of the invention up to the eutectoid plating.

A net (substrate) of 20 mesh (50 mm×50 mm) composed of stain less wires having a diameter of 0.35 mm was electrolytically defatted in a 50 g/l aqueous solution of an electrolytic defatting agent (Eatrex #12, made by Nippon Electroplating Engineers K.K.) at 60° C. and 5 V for 60 seconds. After water washing, it was dipped in an aqueous solution of 6 normal hydrochloric acid for 30 seconds. After further water washing, the gold plating was carried out in a gold striking plating bath (Aurobond TCL, made by Nippon Electroplating Engineers K.K.) at 35° C. and 6 V for 30 seconds. After water washing, the substrate was dipped in an aqueous solution of 5% sulfuric acid for 30 seconds followed by water washing.

A palladium-molybdenum alloy plating bath was prepared by dissolving 1.5 g of palladium chloride, 60 g of sodium molybdate, a trace amount of a phosphoric acid buffer and a trace amount of ammonium phosphate into 800 ml of water, adjusting pH by means of an aqueous solution of 0.05 normal sodium hydroxide and finally diluting it to 1000 ml with water.

The gold plated substrate was plated employing the above palladium-molybdenum alloy plating bath at a temperature of 60° C., at a current density of 0.3 A/dm$^2$ and for 6.5 minutes to obtain a desired catalyst having a palladium-molybdenum eutectoid plated coating on the substrate.

The plated coating thus obtained was the eutectoid plated coating consisting of 13.1% in weight of molybdenum and 86.9% in weight of palladium.

EXAMPLE 2

The eutectoid plating of palladium-molybdenum was carried out while changing the kind of the palladium salt, the amount of the palladium, the amount of the sodium molybdate, the current density of the plating and the plating time of Example 1 as shown in Table 1. The compositions of the plated coatings thus obtained are shown in Table 1.

EXAMPLE 3

The plating was carried out in a plating bath while changing the kind of the palladium salt and the amount of the palladium and replacing the sodium molybdate with sodium tungstate or with the sodium molybdate and sodium tungstate of Example 1.

That is, the eutectoid plating of palladium-tungsten or palladium-molybdenum-tungsten was performed while, as shown in Table 1, changing the amount of the sodium tungstate and the sodium molybdate, the current density of the plating and the plating time. The compositions of the plated coatings thus obtained are shown in Table 1.

Comparative Example 1

A palladium coating was formed on stainless steel by means of the baking process. As a palladium solution, a palladium chloride solution (palladium concentration: 50 g/liter) containing polyvinyl alcohol was employed. After the stainless steel containing 1.0% in weight of aluminum was dipped in the solution followed by pre-drying at 100° C. for 30 minutes, the stainless steel was thermally treated in an oven at 700° C. for four hours to deposit the palladium on the stainless steel by the thermal decomposition.

Comparative Example 2

This Example illustrates the process up to the eutectoid plating of platinum-molybdenum or platinum-tungsten.

TABLE 1

| | Pd Salt and its Amount | | Na Molybdate and/or Na Tungstate and its Amount | | Current Density (A/dm$^2$) | Time (min.) | Composition of Plated Coating (% in weight) | |
| --- | --- | --- | --- | --- | --- | --- | --- | --- |
| Example 1 | PdCl | 1.5 g/l | Na$_2$MoO$_4$ | 60 g/l | 0.3 | 6.5 | Pd—Mo | 13.1 |
| Example 2 | TAPd | 33 g/l | Na$_2$MoO$_4$ | 40 g/l | 0.6 | 3.5 | Pd—Mo | 0.6 |
| | TAPd | 139 g/l | Na$_2$MoO$_4$ | 4.0 g/l | 0.6 | 3.5 | Pd—Mo | 1.1 |
| | PdCl$_2$ | 2.5 g/l | Na$_2$MoO$_4$ | 60 g/l | 0.3 | 6.5 | Pd—Mo | 6.2 |
| | PdCl$_2$ | 2.0 g/l | Na$_2$MoO$_4$ | 70 g/l | 0.4 | 5.0 | Pd—Mo | 19.2 |
| | PdCl$_2$ | 1.5 g/l | Na$_2$MoO$_4$ | 80 g/l | 0.4 | 5.0 | Pd—Mo | 27.6 |
| | PdCl$_2$ | 1.5 g/l | Na$_2$MoO$_4$ | 80 g/l | 0.5 | 4.0 | Pd—Mo | 36.1 |
| Example 3 | TAPd | 66 g/l | Na$_2$WO$_4$ | 4.0 g/l | 0.2 | 10.0 | Pd—W | 0.3 |
| | TAPd | 139 g/l | Na$_2$WO$_4$ | 4.0 g/l | 0.6 | 3.5 | Pd—W | 1.4 |
| | PdCl$_2$ | 2.5 g/l | Na$_2$WO$_4$ | 40.0 g/l | 0.3 | 6.5 | Pd—W | 4.6 |
| | PdCl$_2$ | 2.5 g/l | Na$_2$WO$_4$ | 40.0 g/l | 0.3 | 6.5 | Pd—W | 16.7 |
| | PdCl$_2$ | 1.5 g/l | Na$_2$WO$_4$ | 60.0 g/l | 0.3 | 6.5 | Pd—W | 22.4 |
| | PdCl$_2$ | 2.0 g/l | Na$_2$WO$_4$ | 60.0 g/l | 0.4 | 5.0 | Pd—W | 28.8 |
| | PdCl$_2$ | 1.5 g/l | Na$_2$WO$_4$ | 80.0 g/l | 0.5 | 4.0 | Pd—W | 38.4 |
| | TAPd | 139 g/l | Na$_2$WO$_4$ | 10 g/l | 0.6 | 3.5 | Pd—Mo | 1.2 |
| | | | Na$_2$MoO$_4$ | 10 g/l | | | —W | 1.4 |
| | PdCl$_2$ | 1.5 g/l | Na$_2$WO$_4$ | 30 g/l | 0.3 | 6.5 | Pd—Mo | 7.6 |
| | | | Na$_2$MoO$_4$ | 30 g/l | | | —W | 1.4 |
| | PdCl$_2$ | 2.0 g/l | Na$_2$WO$_4$ | 20 g/l | 0.3 | 6.5 | Pd—Mo | 3.8 |
| | | | Na$_2$MoO$_4$ | 40 g/l | | | —W | 24.1 |
| Comparative Example 2 | CPt | 1.5 g | Na$_2$MoO$_4$ | 90.0 g/l | 0.3 | 10.0 | Pd—Mo | 15.0 |
| | CPt | 3.0 g | Na$_2$WO$_4$ | 60.0 g/l | 0.6 | 5.0 | Pd—W | 11.0 |

Remarks)
TAPd = tetraammine palladiumic acid
CPt = chloroplatinte acid

The gold plating was conducted in the same manner as that of Example 1. After the gold plated substrate was washed with water and dipped in an aqueous solution of 5% sulfuric acid for 30 seconds, the substrate was washed with water.

A platinum-molybdenum alloy plating bath (plating bath ①) was prepared by dissolving 1.5 g of chloroplatinic acid, 90.0 g of sodium molybdate and a trace amount of a phosphoric acid buffer into 800 ml of water, adjusting pH by means of an aqueous solution of 20% sodium hydroxide and finally diluting to 1000 ml with water.

A platinum-tungsten alloy plating bath (plating bath ②) was prepared by dissolving 3.0 g of chloroplatinic acid, 60.0 g of sodium tungstate and a trace amount of a phosphoric acid buffer into 800 ml of water, adjusting pH by means of an aqueous solution of 20% sodium hydroxide and finally diluting to 1000 ml with water.

The gold plated substrate was plated employing the above platinum-molybdenum alloy plating bath ① at a temperature of 60° C., at a current density of 0.3 A/dm$^2$ and for 10 minutes to obtain a desired platinum-molybdenum eutectoid plated coating on the substrate.

The plated coating thus obtained was the outectoid plated coating consisting of 15% in weight of molybdenum and 85% in weight of platinum.

On the other hand, the gold plated substrate was plated employing the above platinum-tungsten alloy plating bath ② at a temperature of 60° C., at a current density of 0.6 A/dm$^2$ and for 5.0 minutes to obtain a desired platinum-tungsten eutectoid plated coating on the substrate.

The plated coating thus obtained was the eutectoid plated coating consisting of 11% in weight of tungsten and 89% in weight of platinum.

Comparative Example 3

Palladium black was plated on the stainless steel mesh employed in Example 1 and the same pretreatment as that of Example 1 was conducted.

A plating bath containing 1.5 g/liter of palladium chloride and 20 g/liter of hydrochloric acid was prepared.

The palladium black was plated on two sheets of the above mesh employing the above plating bath at a temperature of 60° C., at a current of 2.0 A/dm$^2$ and for two minutes to obtain two mesh samples Nos. 1 and 2.

Comparative Example 4

Plating was conducted employing a pure palladium plating bath (Palladex made by Nippon Electroplating Engineers K.K.) or a dull finish palladium plating bath in place of the palladium molybdenum alloy plating bath of Example 1. The respective conditions were as follows.

| Palladium Plating | |
|---|---|
| Bath: | Palladox (palladitim concentration; 10 g/liter) |
| Current Density: | 0.5 A/dm$^2$ |
| Temperature: | 60° C. |
| Plating Time: | 10 minutes |
| Dull Finish | |
| Palladium Plating | |
| Bath: | Liquid prepared by dissolving 6 g of dinitrodiammine palladium in a small amount of aqueous ammonia and diluting it with water to 1 liter (pH: about 7.0) |
| Current Density: | 0.5 A/dm$^2$ |
| Temperature: | 50° C. |
| Plating Time: | 10 minutes |

Comparative Example 5

An alloy piece consisting of 80% in weight of palladium and 20% in weight of molybdenum having a length of 2 cm, a width of 2 cm and a thickness of 5 mm was prepared.

Comparative Example 6

An alloy piece consisting of 80% in weight of palladium and 20% in weight of tungsten having a length of 2 cm, a width of 2 cm and a thickness of 5 mm was prepared.

The catalyst activity of oxidation was evaluated and the peeling test was conducted on the samples of Example 1, Example 2, Example 3, Comparative 1, Comparative 2, Comparative 3, Comparative 4, Comparative 5 and Comparative 6. The results are shown in Table 2.

The oxidation activity was evaluated by an oxygen evolution rate when the samples were placed in 3.5% hydrogen peroxide at room temperature.

The peeling test was conducted in accordance with a tape test method among the peel-off test methods shown in Japan Industrial Standard H-3504.

EXAMPLE 4

The adherence forces when the intermediate gold layer is present and when it is not present between the palladium-tungsten (5.3% in weight) layer or the palladium-molybdenum (6.2% in weight) layer and the substrate of the plated catalysts obtained Examples 1 and 2 were measured. The measurements were conducted in accordance with the tape test method among the peel-off test methods shown in Japan Industrial Standard H-3504 and on the samples immediately upon the plating, upon an anticorrosion accelerated test 1 and upon an anticorrosion accelerated test 2. The results are shown in Table 3.

Accelerated test conditions 1: A sample is dipped in an mixed solution consisting of one portion of concentrated hydrochloric acid and nine portions of water for 10 hours.

Accelerated test conditions 2: A sample is dipped in an mixed solution at 50° C. containing 5% in weight of potassium hydroxide and 5% in weight of potassium chloride for 10 days.

TABLE 2

| | Composition (% in weight) | | Evolved Oxygen (ml/min) | Peeling Test |
|---|---|---|---|---|
| Example 1 | Pd—Mo | 13.1 | 428 | No Peeling |
| Example 2 | Pd—Mo | 0.6 | 4.8 | No Peeling |
| | Pd—Mo | 1.1 | 5.4 | No Peeling |
| | Pd—Mo | 6.2 | 11.8 | No Peeling |
| | Pd—Mo | 19.2 | 521 | No Peeling |
| | Pd—Mo | 27.6 | 923 | No Peeling |
| | Pd—Mo | 36.1 | 1000 | Partial Peeling |
| Example 3 | Pd—W | 0.3 | 1.3 | No Peeling |
| | Pd—W | 1.4 | 11.4 | No Peeling |
| | Pd—W | 4.6 | 16.8 | No Peeling |
| | Pd—W | 16.7 | 461 | No Peeling |
| | Pd—W | 22.4 | 666 | No Peeling |
| | Pd—W | 28.8 | 923 | No Peeling |
| | Pd—W | 38.4 | 1090 | Partial Peeling |
| | Pd—Mo (1.2)—W (1.4) | | 8.2 | No Peeling |

TABLE 2-continued

|  | Composition (% in weight) | Evolved Oxygen (ml/min) | Peeling Test |
|---|---|---|---|
|  | Pd—Mo (7.6)—W (16.6) | 666 | No Peeling |
|  | Pd—Mo (3.8)—W (24.1) | 961 | No Peeling |
| Comparative Example 3 | Pd Black Plating 1 | 422 | Peeling |
|  | Pd Black Plating 2 | 204 | Partial Peeling |
| Comparative Example 4 | Pd Plating | 2.1 | No Peeling |
|  | Dull Finish Pd Plating | 18 | No Peeling |
| Comparative Example 5 | Pd—Mo Alloy Piece | 0 | — |
| Comparative Example 6 | Pd—W Alloy Piece | 0 | — |
| Comparative Example 1 | Baking Process Catalyst | 25 | No Peeling |
| Comparative Example 2 | Pt—Mo 15.0 | 171 | No Peeling |
|  | Pt—W 11.0 | 312 | No Peeling |

TABLE 3

| Sample | | Peeling Test | | |
|---|---|---|---|---|
|  | Au Plating | Upon Plating | Upon Test 1 | Upon Test 2 |
| Pd—W (4.6% in weight) | no | Partial Peeling | Complete Peeling | Complete Peeling |
|  | yes | No Peeling | Partial Peeling | Partial Peeling |
| Pd—Mo (6.2% in weight) | no | Partial Peeling | Complete Peeling | Partial Peeling |
|  | yes | No Peeling | Partial Peeling | No Peeling |

What is claimed is:

1. A liquid phase oxidation catalyst which comprises a metal substrate and an eutectoid coating containing palladium and, molybdenum and/or tungsten coated on the substrate.

2. The liquid phase oxidation catalyst as claimed in claim 1, wherein an intermediate gold coating layer is present between the metal substrate and the eutectoid coating.

3. A process of preparing a liquid phase oxidation catalyst which comprises, electroplating a metal substrate in a solution containing palladium and, molybdenum and/or tungsten to obtain a catalyst having an eutectoid coating containing palladium and, molybdenum and/or tungsten coated on the substrate.

4. The process as claimed in claim 3, wherein, prior to the eutectoid electroplating, the process further comprising gold plating the metal substrate.

* * * * *